(12) United States Patent
Aura

(10) Patent No.: US 7,409,544 B2
(45) Date of Patent: Aug. 5, 2008

(54) METHODS AND SYSTEMS FOR AUTHENTICATING MESSAGES

(75) Inventor: Anssi Tuomas Aura, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 746 days.

(21) Appl. No.: 10/401,241

(22) Filed: Mar. 27, 2003

(65) Prior Publication Data

US 2004/0193875 A1 Sep. 30, 2004

(51) Int. Cl.
*H04L 9/00* (2006.01)

(52) U.S. Cl. .................................. 713/162
(58) Field of Classification Search ............... 713/162
See application file for complete search history.

(56) References Cited

U.S. PATENT DOCUMENTS

| | | |
|---|---|---|
| 5,473,691 A | 12/1995 | Menezes et al. |
| 5,511,122 A | 4/1996 | Atkinson |
| 5,563,998 A | 10/1996 | Yakish et al. |
| 5,673,319 A | 9/1997 | Bellare et al. |
| 5,729,608 A | 3/1998 | Janson et al. |
| 5,778,065 A | 7/1998 | Hauser et al. |
| 5,784,562 A | 7/1998 | Diener |
| 5,787,172 A | 7/1998 | Arnold |
| 5,892,904 A | 4/1999 | Atkinson et al. |
| 5,903,721 A | 5/1999 | Sixtus et al. |
| 5,944,794 A | 8/1999 | Okamoto et al. |
| 6,028,938 A | 2/2000 | Malkis et al. |
| 6,055,234 A | 4/2000 | Aramaki |
| 6,055,236 A | 4/2000 | Nassett et al. |
| 6,088,700 A | 7/2000 | Larsen et al. |
| 6,101,499 A | 8/2000 | Ford et al. |
| 6,108,673 A | 8/2000 | Brandt et al. |
| RE36,946 E | 11/2000 | Diffie et al. |

(Continued)

FOREIGN PATENT DOCUMENTS

EP 1333635 8/2003

(Continued)

OTHER PUBLICATIONS

"Glossary for the Linux FreeS/WAN project," (Publication Date Not Available), [34 pages].

(Continued)

*Primary Examiner*—Gilberto Barron, Jr.
*Assistant Examiner*—Kristin D Sandoval
(74) *Attorney, Agent, or Firm*—Merchant & Gould, P.C.

(57) ABSTRACT

Disclosed is an authentication mechanism that provides much of the security of heavyweight authentication mechanisms, but with lower administrative and communicative overhead while at the same time not being limited to a 64-bit limit on the length of a cryptographic hash value. Removal of this limitation is achieved by increasing the cost of both address generation and brute-force attacks by the same parameterized factor while keeping the cost of address use and verification constant. The address owner computes two hash values using its public key and other parameters. The first hash value is used by the owner to derive its network address. The purpose of the second hash is to artificially increase that computational complexity of generating new addresses and, consequently, the cost of brute-force attacks. As another measure against brute-force attacks, the routing prefix (i.e., the non-node selectable portion) of the address is included in the first hash input.

18 Claims, 10 Drawing Sheets

U.S. PATENT DOCUMENTS

| | | | |
|---|---|---|---|
| 6,148,405 | A | 11/2000 | Liao et al. |
| 6,175,833 | B1 | 1/2001 | West et al. |
| 6,229,806 | B1 | 5/2001 | Lockhart et al. |
| 6,237,035 | B1 | 5/2001 | Himmel et al. |
| 6,247,029 | B1 | 6/2001 | Kelley et al. |
| 6,367,012 | B1 | 4/2002 | Atkinson et al. |
| 6,421,673 | B1 | 7/2002 | Caldwell et al. |
| 6,424,981 | B1 | 7/2002 | Isaac et al. |
| 6,526,506 | B1 | 2/2003 | Lewis |
| 6,600,823 | B1 | 7/2003 | Hayosh |
| 6,615,348 | B1 | 9/2003 | Gibbs |
| 6,687,755 | B1 | 2/2004 | Ford et al. |
| 6,832,322 | B1 | 12/2004 | Boden et al. |
| 6,944,672 | B2 | 9/2005 | Crow et al. |
| 6,957,346 | B1 | 10/2005 | Kivinen et al. |
| 7,032,242 | B1 | 4/2006 | Grabelsky et al. |
| 7,134,019 | B2 * | 11/2006 | Shelest et al. ............... 713/170 |
| 2002/0152380 | A1 | 10/2002 | O'Shea et al. |
| 2003/0028790 | A1 | 2/2003 | Bleumer |
| 2003/0065934 | A1 | 4/2003 | Angelo et al. |
| 2003/0120929 | A1 * | 6/2003 | Hoffstein et al. ............ 713/176 |
| 2003/0142823 | A1 | 7/2003 | Swander et al. |
| 2003/0233568 | A1 | 12/2003 | Maufer et al. |
| 2004/0008845 | A1 * | 1/2004 | Le et al. ..................... 380/277 |
| 2004/0010683 | A1 | 1/2004 | Huitema |
| 2004/0088537 | A1 | 5/2004 | Swander et al. |
| 2004/0151322 | A1 | 8/2004 | Sovio et al. |
| 2004/0158714 | A1 * | 8/2004 | Peyravian et al. ........... 713/171 |
| 2004/0193875 | A1 | 9/2004 | Aura |
| 2004/0225881 | A1 | 11/2004 | Walmsley |
| 2004/0249757 | A1 | 12/2004 | Walmsley |
| 2006/0005014 | A1 | 1/2006 | Aura et al. |
| 2006/0020796 | A1 | 1/2006 | Aura et al. |
| 2006/0020807 | A1 | 1/2006 | Aura et al. |
| 2006/0077908 | A1 | 4/2006 | Park et al. |

FOREIGN PATENT DOCUMENTS

| | | |
|---|---|---|
| WO | 2006068450 | 6/2006 |

OTHER PUBLICATIONS

Bassil, Alessandro; Laganier, Julien. "Towards an IPv6-based Security Framework for Distributed Storage Resources," Communications and Multimedia Security CMS 2003, Oct. 2-3, 2003, [9 pages].

Benantar, M. "The Internet Public Key Infrastructure," IBM Systems Journal, vol. 40, No. 3, 2001, pp. 648-665.

Cheng, P.C.; Garay, J.A; Herzberg, A.; Krawczyk, H. "A Security Architecture for the Internet Protocol," 1998, vol. 37, No. 1, pp. 42-60.

Cheng, Pau-Chen; Garay, Juan A.; Herzberg, Amir; Krawczyk, Hugo. "Design and Implementation of Modular Key Management Protocol and IP Secure Tunnel on AIX," Jun. 1995, [15 pages].

Cheng, PC. "An Architecture for the Internet Key Exchange Protocol," IBM Systems Journal, vol. 40, No. 3, 2001, pp. 721-746.

Clark, David D. "IP Datagram Reassembly Algorithms," RFC 815, Jul. 1982, [11 pages].

Higginson, Peter L.; Shand, Michael C. "Development of Router Clusters to Provide Fast Failover in IP Networks," Digital Technical Journal vol. 9 No. 3, 1997, pp. 32-41.

Kent et al. "IP Encapsulating Security Payload (ESP)," The Internet Society, RFC 2406, Nov. 1998, [34 pages].

Koskiahde, Timo. "Security in Mobile IPv6," Apr. 18, 2002, pp. 1-14.

Maughan et al. "Internet Security Association and Key Management Protocol (ISAKMP)," The Internet Society, RFC 2408, Nov. 1998, [141 pages].

Shannon, Colleen; Moore, David; Claffy, K. "Characteristics of Fragmented IP Traffic on Internet Links," Internet Measurement Conference. 2001, pp. 83-97.

Aura, T. "Cryptographically Generated Addresses (CGA)," RFC 3972, Mar. 2005, [21 pages].

Kaufman, C. "Internet Key Exchange (IKEv2) Protocol," RFC 4306, Dec. 2005, [93 pages].

Link, B., Hager, T. and Flaks J. "RTP Payload Format for AC-3 Audio," RFC 4148, Oct. 2005, [13 pages].

Nir, Y. "Repeated Authentication in Internet Key Exchange (IKEv2) Protocol," RFC 4478, Apr. 2006, [5 pages].

Snapschout, JLA Van De. "The sliding window protocol revisited," Formal Aspects of Computing vol. 7, pp. 3-17, 1995.

Tannenbaum, AS. "Computer Networks", Chapter 4, Prentice-Hall, 1989, [76 page}.

Laganier, J. "Using IKE with IPv6 Cryptographically Generated Address," Network Working Group, Internet-Draft. Feb. 24, 2003, pp. 1-14.

Thomson et al., IPv6 Stateless Address Autoconfiguration, RFC 1971 (Aug. 1996) 22 pgs downloaded from: http://www.ietf.org/rfc1971.txt; on Apr. 11, 2006.

Nordmark, "Allocating bit in IID for Mobile IPv6", Mar. 2002, [accessed May 29, 2005 from http://www.ietf.org/proceedings/02mar/slides/ipv6-13.pdf], 8 pgs.

Nordmark, "Reserving Space in the Interface ID", from Mar. 2002 [accessed May 29, 2005 from http://www.ietf.org/proceedings/02mar/slides/ipv6-14.pdf], 6 pgs.

IETF Proceedings, "Security and Mobile IPv6", Mar. 2001 [accessed May 29, 2005 from http://www.ietf.org/proceedings/01mar/slides/mobileip-9], 1 pg.

Kempf et al., "Threat Analysis for IPv6 Public Multi-Access Links", draft-kempf-ipng-netaccess-threats-00.txt, Nov. 2001, 7 pgs.

Nikander et al., "Threat Models introduced by Mobile IPv6 and requirements for Security in Mobile IPv6", draft-team-mobileip-mipv6-sec-reqts-00.txt, Jul. 12, 2001, 28 pgs.

Thomas, "Binding Updates Security", draft-thomas-mobileip-bu-sec-00.txt, Nov. 2, 2001, 13 pgs.

Nikander et al., Binding Authentication Key Establishment Protocol for Mobile IPv6, draft-perkins-bake-01.txt, Jul. 2, 2001, 42 pgs.

Aura, Tuomas, Cryptographically Generated Addresses (CGA), Microsoft Research, Roger Needham Bldg, Cambridge CB3 OFB, UK.

Gehrmann, Christian, Mitchell, Chris J., Nyberg, Kaisa, "Manual Authentication for Wireless Devices", Jan. 23, 2004, pp. 1-9.

McCune, Jonathan M., Perrig, Adrian, Reiter, Michael K., "Seeing-Is-Believing: Using Camera Phones for Human-Verifiable Authentication", School of Computer Science, Carnegie Mellon Unversity, Nov. 2004, CMU-CS-04-174, pp. 1-20.

Balfanz, Dirk, Smetters, Paul Stewart, Wong, Chi H., "Talking to Strangers: Authentication in Ad-Hoc WIreless Networks", Xerox Palo Alto Research Center. 13 pgs.

Anderson, Ross, Stajano, Frank, Lee, Jong-Hyeon, "Security Policies", 43 pgs.

Intel Technology Journal, "Interoperable Home Infrastructure", vol. 6, Issue 4, Published Nov. 15, 2002, ISSN 1535-766X, 78 pgs.

Final OA issued in U.S. Appl. No. 10/242,705, Mail Date: Feb. 9, 2007.

OA issued in U.S. Appl. No. 10/242,705, Mail Date: Aug. 8, 2006.

OA issued in U.S. Appl. No. 10/242,705, Mail Date: Feb. 16, 2006.

Laganier, J. "Using IKE with IPv6 Cryptographically Generated Address," Network Working Group, Internet-Draft. Jul. 8, 2007, 21 pgs.

IPSEC, "Minutes of IPSEC Working Group Meeting", "2.5.2 IP Security Protocol (ipsec)". Proceedings of the 52nd Internet Engineering Task Force, Dec. 9-14, 2001, Salt Lake City, USA, Last Modified: Nov. 2, 2001. http://www3.ietf.org/proceedings/01dec/195.htm (14 pgs.).

Kent, Christopher A., Mogul, Jeffrey C., "Fragmentation Considered Harmful", Digital Equipment Corporation, Western Research Lab (originally pub. In Proc. SIGCOMM '87, vol. 17, No. 5, Oct. 1987, 13 pgs.

Kent, S. "Security Architecture for the Internet Protocol", Network Working Group, Comments: 4301, Dec. 2005, 95 pgs., http://www.rfc-editor.org/rfc/rfc4301.txt.

Kent, S., "IP Authentication Header", Network Working Group, Comments: 4302, Dec. 2005, 35 pgs., http://rfc.net/rfc4302.html.

Kent et al. "IP Encapsulating Security Payload (ESP)," Network Working Group, Comments 4303, Dec. 2005, 42 pgs.

Housley, R., Using Advanced Encryption Standard (AES) CCM Mode with Ipsec Encapsulating Security Payload (ESP), Comments: 4309, Dec. 2005, 13 pgs.

M. Burrows et al., "A Logic of Authentication" Proceedings of the Royal Society of London Series A, 426, pp. 233-271 (1989).

S. Deering et al., "Version 6 (IPv6) Specification" RFC2460 (Dec. 1998).

"Secure Hash Standard," NIST, FIPS PUB 180-1, http://csrc.nist.goc/fips/fip180-1.txt. (Apr. 1995).

Harkins et al., "The Internet Key Exchange (IKE)," RFC2409 (Nov. 1998).

Hinden et al., "IP Version 6 Addressing Architecture," (Feb. 2, 2001).

Huitema, "Ipv6 The New Internet Protocol," Prentice Hall PTR, ISBN 0-13-850505-5 (1998).

Johnson et al. "Mobility Support in IPv6," (Nov. 17, 2000).

Kent et al., "IP Authentication Header," RFC2402 (Nov. 1998).

Mills, "Simple Network Time Protocol (SNMP) Version 4 for IPv6 and OSI," RFC2030 (Oct. 1996).

Perkins, "IP Mobility Support," RFC2002 (Oct. 1996).

Thomson et al., "IPv6 Stateless Address Autoconfiguration," RFC2462 (Dec. 1998).

Kent et al., "Security Architecture for the Internet Protocol," RFC2401 (Nov. 1998).

Aura et al., *Security of Internet Location Management*, In Proc. 18th Annual Computer Security Applications Conference, IEEE Press, Nevada (Dec. 2002).

Blaze et al., *The Keynote Trust-Management System Version 2*, IETF Network Working Group (Sep. 1999).

Eastlake, *Domain Name System Security Extensions*, IETF Network Working Group (Mar. 1999).

Ellison et al., *SPKI Certificate Theory*, IETF Network Working Group (Sep. 1999).

Ferguson et al., *Network Ingress Filtering: Defeating Denial Of Service Attacks Which Employ IP Source Address Spoofing*, IETF Network Working Group (May 2000).

Housley et al., *Internet X.509 Public Key Infrastructure Certificate And Certificate Revocation List (CRL) Profile*, IETF Network Working Group (Apr. 2002).

Karn et al., *Photuris: Session-Key Management Protocol*, IETF Network Working Group (Mar. 1999).

Montenegro et al., *Statistically Unique and Cryptographically Verifiable Identifiers And Addresses*, In Proc. ISOC Symposium on Network and Distributed System Security (NDSS 2002), San Diego (Feb. 2002).

Moskowitz, *Host Identity Payload And Protocol*, Internet-Draft draft-ietf-moskowitz-hip-06.txt, (Oct. 2001) (Work in progress).

Narten et al., *Privacy Extensions For Stateless Address Autoconfiguration In Ipv6*, IETF Network Working Group (Jan. 2001).

Narten et al., *Neighbor Discovery For IP Version 6 (IPv6)*, IETF Network Working Group, (Dec. 1998).

Nikander, *A Scaleable Architecture For IPv6 Address Ownership*, Internet-draft (Mar. 2001).

Okazaki et al., *Mipv6 Binding Updates Using Address Based Keys (Abks)*. Internet-Draft, (Oct. 2002).

Roe et al., *Authentication Of Mobile IPv6 Binding Updates And Acknowledgments*. Internet-Draft, IETF Mobile IP Working Group (Feb. 2002).

Savola. *Security Of Ipv6 Routing Header And Home Address Options*. Internet-draft, IETF (Dec. 2002).

Shamir, *Identity-Based Cryptosystems And Signature Schemes*, In Advances in Cryptology: Proc. CRYPTO 84, vol. 196 of LNCS, pp. 47-53, (1998).

Arkko et al., *Securing IPv6 Neighbor Discovery And Router Discovery*, In Proc. 2002 ACM Workshop on Wireless Security (WiSe), pp. 77-86, (Sep. 2002) ACM Press.

Aura, *Cryptographically Generated Addresses (CGA)*; Internet-Draft, IETF Securing Neighbor Discovery Working Group (Feb. 2003).

O'Shea et al., *Child-Proof Authentication For Mipv6 (CAM)*, ACM Computer Communications Review, 31(2) (Apr. 2001).

International Telecommunication Union. ITU-T recommendation X.690, *Information Technology—ASN.1 Encoding Rules: Specification Of Basic Encoding Rules (BER), Canonical Encoding Rules (CER) And Distinguished Encoding Rules (DER)*, (Jul. 2002).

Hinden et al., IP version 6 Working Group Minutes, Minneapolia IETF, Mar. 18, 2002 [accessed May 29, 2005 from http://www.ietf.org/proceedings/02mar/minutes/ipv6.htm], 13 pgs.

Hinden et al., "IP Version 6 Addressing Architecture," (Mar. 10, 2000).

Johnson et al., Mobility Support in IPv6, (Apr. 27, 2000).

PCT International Search Report in PCT/US06/25352, Feb. 6, 2008.

* cited by examiner

METHODS AND SYSTEMS FOR AUTHENTICATING MESSAGES

TECHNICAL FIELD

The present invention relates generally to communications in computer networks, and, more particularly, to authenticating information communicated between network nodes.

BACKGROUND OF THE INVENTION

Authentication is an important issue in many types of network communications. Many messages are meaningful only if the recipient can verify the identity of the sender. In some cases, the recipient associates a particular characteristic with a sender's identity. When a message is received that is known to come from that sender, the recipient refers to the characteristic in deciding what action to take. For example, a company employee associates the characteristic "authority to issue certain orders" with the company's president. Upon receiving the message "Take tomorrow off," the employee treats the message with more respect if the message is known to come from the company president than if it came from an anonymous person. In another example, the recipient associates the characteristic "truth in reporting" with the identity of certain news outlets but not with other news outlets nor with the populace in general. Even if a message is received from a sender for whom the recipient has no pre-established association, the sender's identity may be meaningful in linking multiple messages together. For example, a police department receiving the message "False alarm: I'm not being robbed after all" would presumably accept the message at face value only if it could verify that the sender was indeed the same person who sent the earlier "Help! I'm being robbed!" message.

In network communications, an often used form of identity is the network address used by a device to identify itself on the network. Messages are typically tagged with this form of identity, which can be used by a recipient to address a message in response. However, a nefarious party may easily send a message with a deceptive sender's address. Without an authentication mechanism verifying that the sender's network address contained in the message is actually the originating address, this form of identity is vulnerable to fraudulent misrepresentation.

In addition to sending unauthentic messages, a nefarious party may try to prevent other parties from communicating with each other. This type of threat is called denial-of-service. There are many types of denial-of-service attacks against communication systems. In computer networks, one particular type of denial-of-service attack is one where the attacker prevents a network node from obtaining a network address. More generally, in any system where an identifier or identity authentication is a pre-requisite for participation in the system, an attacker may try to prevent the participants from obtaining suitable identifiers.

Protocols address the problem of fraudulent misrepresentation and denial-of-service by implementing authentication services. The recipient of a message uses the authentication services to verify the identity of the sender of the message. The recipient then takes action based on the characteristics associated with the sender's identity. Formerly, a perceived difficulty in implementing authentication was that some of the authentication services provided their security by means of quite complicated mechanisms. They came at a heavy perceived price in terms of a significant investment in administrative and communicative overhead. Several earlier proposals focused on easing this administrative burden. For example, cryptographically generated addresses (CGAs)-IPv6 addresses where some of the address bits, usually the 64-bit interface identifier, are created from a cryptographic hash of the address owner's public key—offer an advantage in that no third parties or additional infrastructure, such as a public-key infrastructure (PKI), is needed to verify signatures. Any IPv6 node capable of basic cryptographic operations could generate a CGA address locally, and only the address and the public key were needed for verifying the signatures. Though initially promising, earlier contemplated CGA proposals present a major security weakness inherent in the 64-bit limit on the hash length.

SUMMARY OF THE INVENTION

In view of the foregoing, the present invention discloses a generic and extensible format for CGAs and an associated authentication mechanism that provides much of the security of heavyweight authentication mechanisms, but with lower administrative and communicative overhead while at the same time not being limited to a 64-bit limit on the length of a cryptographic hash value. Removal of this limitation is achieved by increasing the cost of both address generation and "brute-force" attacks (i.e., exhaustive searches for hash collisions or large pre-computed databases of interface identifiers from an attacker's own public key(s) used to find matches for many addresses) by the same parameterized factor while keeping the cost of address use and verification constant.

The address owner computes two hash values using its public key and other parameters. The network address is derived from the first hash value. The second hash value sets an input parameter for the first hash value and it is the combination of the two hash values that increases the computational complexity of generating new addresses and, consequently, the cost of brute-force attacks. The combination of two hash values allows the address owner to select levels of security above the 64-bit limit of prior CGA-based authentication mechanisms.

As another measure against brute-force attacks, the routing prefix (i.e., the non-node selectable portion) of the address may be included in the first hash input. Including the routing prefix in the first hash calculation increases the cost of pre-computation attacks by making some brute-force attacks against global-scope addresses more expensive because the attacker must do a separate brute-force search for each address prefix. However, should the address owner move between networks and thereby change the corresponding routing prefix, the second hash value can be reused because it is independent of the value of the routing prefix, thus avoiding the computationally expensive part of address generation. Because the high overhead of re-calculating the second hash function is not necessary when the routing prefix changes, the invention is well suited for mobile communications applications.

In keeping with the invention, the input to both hash functions may be formatted as parts of a self-signed certificate. A self-signed certificate is a standard format for storing and transferring public keys in Internet protocols. The signature on the certificate proves that the public-key owner wants to use the CGA. Additionally, certificates make it easier to use CGA-based and Public Key Infrastructure (PKI)-based address authentication side by side in the same protocols. Some protocols, however, may need to save octets and transfer only the public key and other absolutely necessary parameters, rather than a full self-signed certificate. An optimized parameter format is defined for this purpose.

The address owner uses the CGA as its own address when it sends a message or, if sending the message from another address, indicates that it is being sent on behalf the CGA. The recipient of the message with the self-signed certificate authenticates its source by performing the two hash functions on the public key and other parameters.

In the CGA-based authentication mechanism of the present invention, the recipient of the message may be either an independent entity or the same entity that created the message. An example of the latter is the message creator storing messages for retrieval at a later time. When the creator of the message retrieves the message, the authentication mechanism assures that the integrity of the message has not been compromised while it has been stored.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
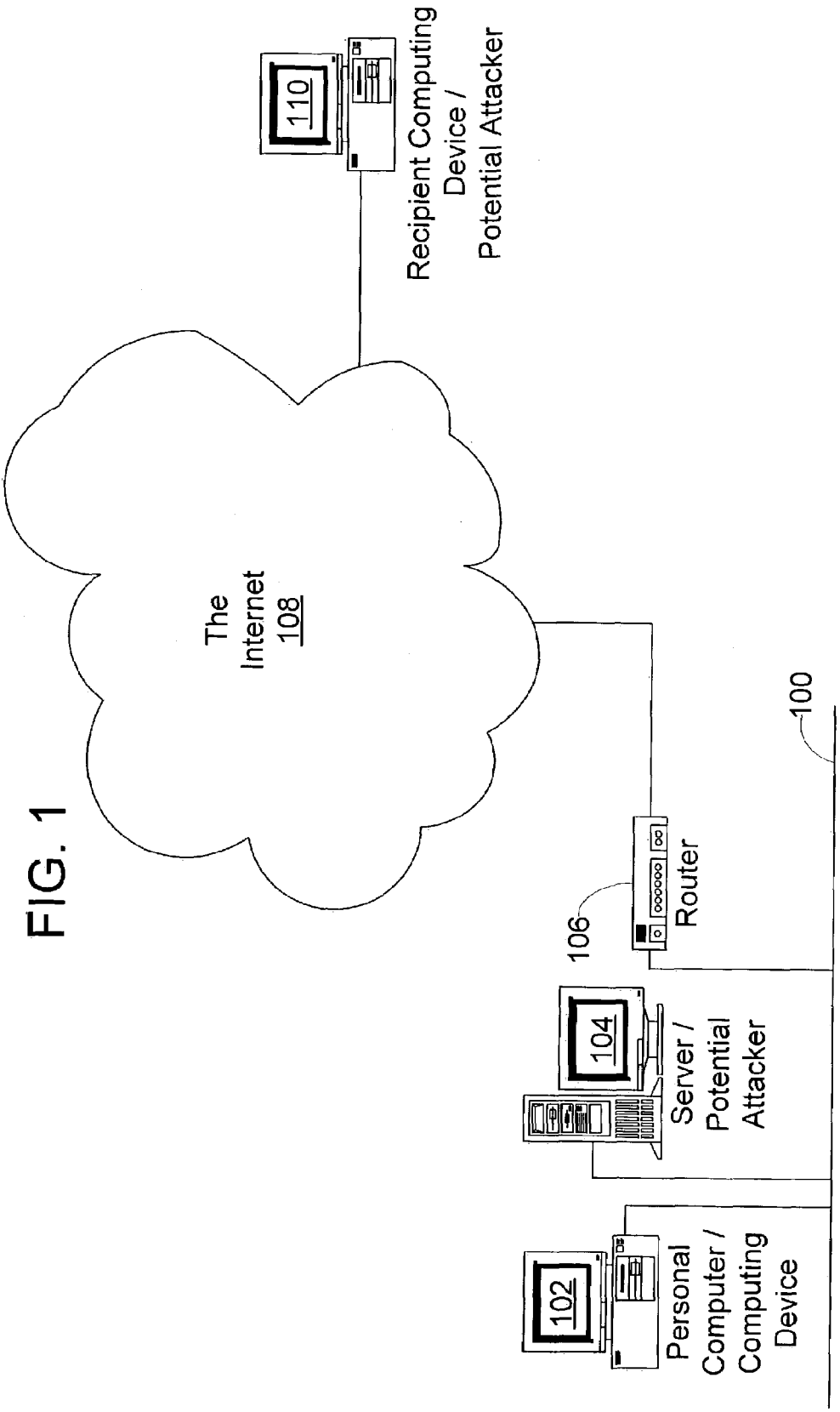
FIG. 1 is a schematic diagram showing an exemplary communications network in which the authentication mechanism of the invention can be practiced.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein. Sections I through III below describe the basics of the message authentication mechanism. Section IV presents implementation options useful in particular situations. Section V shows how the authentication mechanism operates in situations beyond those discussed in Sections I through III.

I. The Problem of Authentication

The present invention is directed to a simple, lightweight, mechanism to authenticate a message, i.e., to determine whether the message can be trusted to be from the sender address it purports to be from. This authentication mechanism can be applied to any type of message to enhance network security.

To facilitate an understanding of the need for a lightweight, low-overhead, and easily deployable authentication mechanism such as the one provided by the invention, consider the exemplary network of FIG. 1. Accompanying a computing device 102 on a local area network (LAN) 100 is a server 104 and a router 106. The router allows the devices on the LAN to communicate over an internetwork 108 to remote computing devices such as device 110. The Internet is one example of an internetwork. Any of the devices, including the router, in FIG. 1 may send a message to any other device. In protocols typically used today, the message contains the network address of the sender (the "FROM address") and the network address of the recipient ("the TO address"). Consider, as a first example, that device 102 is operated by a systems administrator authorized to reconfigure the router 106. For security's sake, the router does not accept commands from devices other than device 102. But when the router receives a reconfiguration command message with its FROM address set to the address of device 102, the router believes the message is authentic and carries out the command. (This example is for illustrative purposes only: Router communications are generally much more secure than is depicted here.) However, it is very easy to create and send a message with a deceptive FROM address. For example, device 110 could create a router reconfiguration command message and put device 102's network address in the FROM address field. Without a mechanism for authenticating a message, the router cannot know which device actually sent the message. The router does not know that the message is not authentic and carries out the command, possibly compromising the security of all of the devices on the LAN. As a second example, device 102 uses a "Neighbor Discovery" protocol to discover which router it should use when communicating with remote devices such as device 110. Without an authentication mechanism in place, device 104 may impersonate router 106. Messages from device 102 intended for device 110 would then go to device 104 that may read their contents, discard them (thus launching a denial-of-service attack against device 102), or alter them before sending them on to device 110. As a third example, device 104 may interfere with the process in which device 102 obtains a network address. For example, if device 102 executes a "Duplicate Address Detection" protocol to check that no other network node is using the same address as device 102, device 104 may generate messages that make it appear as if all addresses were already in use (i.e., owned) by some other network node. This way, device 104 can prevent device 102 from obtaining an address on the network. These are just three examples illustrating the ubiquitous need for authentication. The examples are extendable to any sort of message sent to any sort of device using any sort of communications method or protocol.

To fend off attacks of the sort described in the first two examples of the previous paragraph, a recipient of a message needs to authenticate the sender of the message, that is, determine if the message was actually sent by the sender indicated in the message. When the recipient is able to reliably determine the true sender of a message, then the recipient can choose to act on the message only if it is sent by an appropriate or trusted device. To fend off attacks of the sort described in the third example of the previous paragraph, a network node needs a method of generating a new network address and for proving that that it has, with high probability, generated the address itself. Such a method prevents malicious network nodes from falsely claiming ownership of the new address with a significant success rate. Section III below details how the present invention enables both the authentication and the address-generation and address-ownership verification methods described above.

II. Exemplary Environment

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
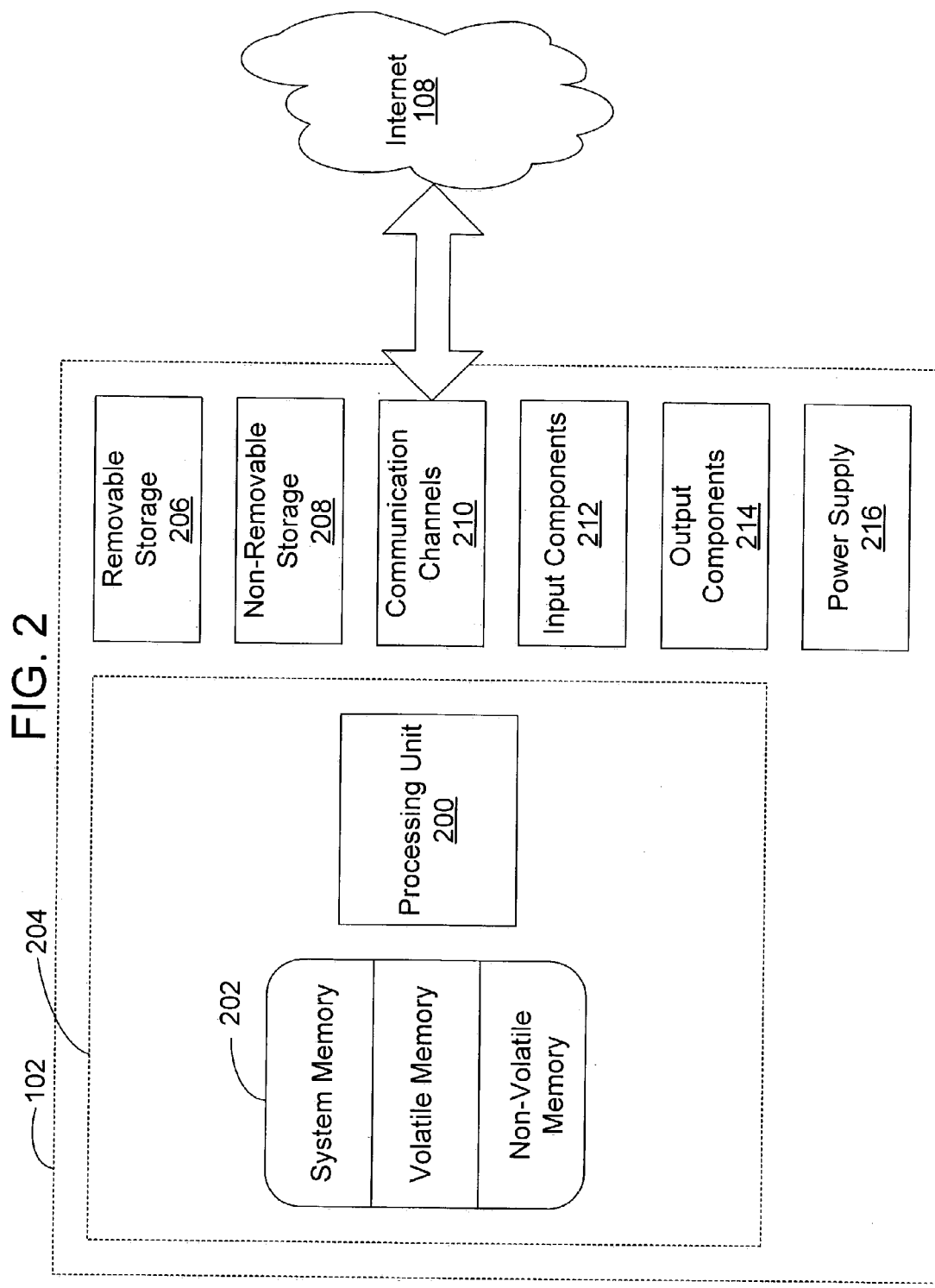
FIG. 2 is a schematic diagram showing an exemplary computer architecture on which the mechanisms of the invention may be implemented.

Referring to FIG. 2, the present invention relates to communications between network nodes on connected computer networks. Each of the network nodes resides in a computer that may have one of many different computer architectures. For descriptive purposes, FIG. 2 shows a schematic diagram of an exemplary computer architecture usable for these devices. The architecture portrayed is only one example of a suitable environment and is not intended to suggest any limitation as to the scope of use or functionality of the invention. Neither should the computing devices be interpreted as having any dependency or requirement relating to any one or combination of components illustrated in FIG. 2. The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing device 102 typically includes at least one processing unit 200 and memory 202. The memory 202 may be volatile (such as RAM), non-volatile (such as ROM, flash memory, etc.), or some combination of the two. This most basic configuration is illustrated in FIG. 2 by the dashed line 204.

The storage media devices may have additional features and functionality. For example, they may include additional storage (removable and non-removable) including, but not limited to, PCMCIA cards, magnetic and optical disks, and magnetic tape. Such additional storage is illustrated in FIG. 2 by removable storage 206 and non-removable storage 208. Computer-storage media include volatile and non-volatile, removable and non-removable media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing device.

Computing device 102 may also contain communication channels 210 that allow the host to communicate with other devices. Communication channels 210 are examples of communications media. Communications media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, radio, infrared, and other wireless media. The term computer-readable media as used herein includes both storage media and communications media. The computing device 102 may also have input components 212 such as a keyboard, mouse, pen, a voice-input component, a touch-input device, etc. Output components 214 include screen displays, speakers, printer, etc., and rendering modules (often called "adapters") for driving them. The computing device 102 has a power supply 216. All these components are well known in the art and need not be discussed at length here.

III. Authentication of a Message

The invention enables a device, such as the computing device 102, to write a message in a way that the message could only have been written by this particular device. This authentication mechanism is unilateral in that the recipient does not need to have further communications with the sender for completing the authentication process. This is because the message contains everything the message recipient, such as the router 106, needs to decode the message and to determine that it must have come from a particular device such as the computing device 102.

The invention is based on public key cryptography used in combination with the selection of a network address of the message sender based on the public key and other parameters. This selected network address is called the Cryptographically Generated Address (CGA). In the example of FIG. 1, the CGA address is an address of the computing device 102. One way this address may be derived from the public key of the device 102 is described in connection with FIGS. 3, 4, and 5.

Figure 3:
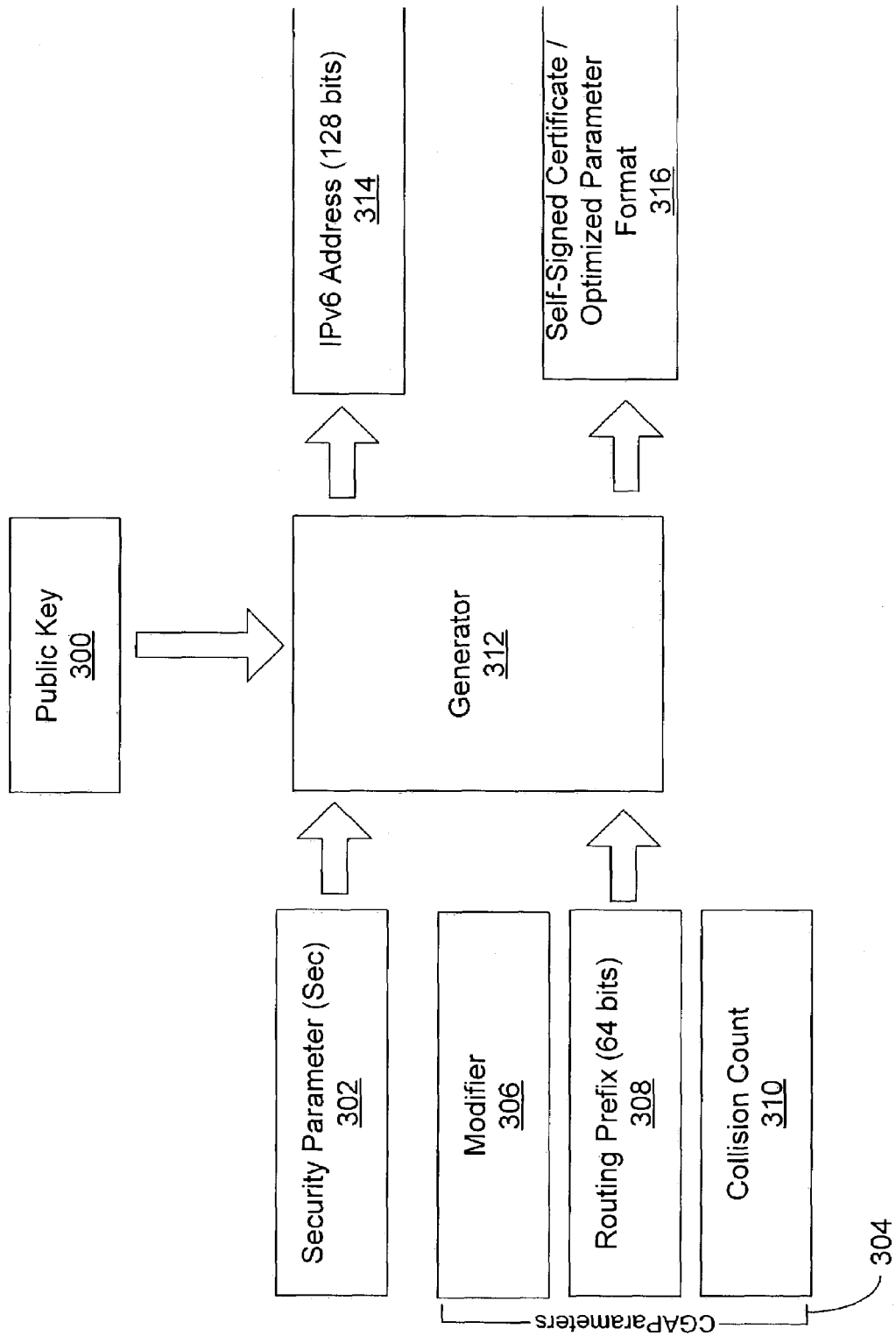
FIG. 3 is a schematic diagram showing the inputs and outputs of the address generation procedure.

As FIG. 3 shows, a CGA generator 312 in the computing device 102 takes five inputs: the public key 300 of the address owner, the routing prefix 308 of the network, a collision count 310 data value (initially set to zero), a modifier 306 data value (a random 12-octet string), and the security parameter (Sec) 302, which is an unsigned 3-bit integer having a value between 0 and 7 (the value of which is selected by the computing device 102). The generator 312 outputs a new CGA address 314 and the associated self-signed certificate 316.

Figure 5:
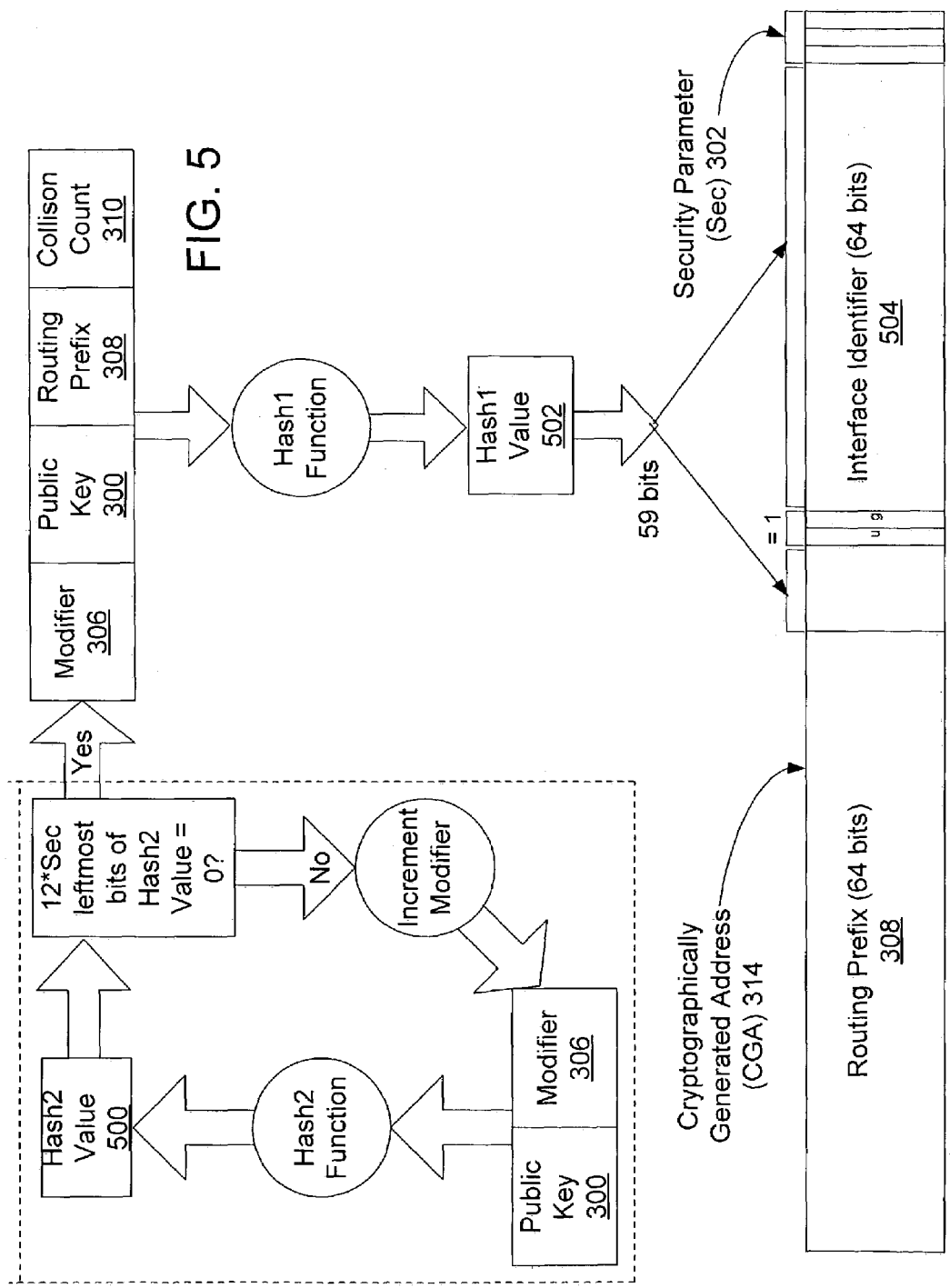
FIG. 5 is a schematic diagram showing how a cryptographically generated address is derived from a public key of the sending device and other parameters.

Turning to FIG. 5, an IPv6 address 314 is 128 bits long. It is divided into two parts. The leftmost 64 bits are the routing prefix 308. These bits are used for routing IP packets across the Internet to the destination network. The rightmost 64 bits are the interface identifier 504. These bits identify an individual node within a local network. The interface identifier 504 part of the address is referred to as the "node-selectable" portion because the sending device 102 is free to set this part as it sees fit. The interface identifiers may be chosen in an arbitrary way, e.g., randomly, as long as no two nodes on the same network share the same value. While the division of the 128-bit IPv6 address 314 to two 64-bit parts is typical, the division can be done in some other proportion. For example, the length of the interface identifier 504 could be increased at the expense of decreasing the length of the routing prefix 308. The present invention is useful as long as the interface identifier is perceived to be too short to contain a strong cryptographic hash value.

Two bits of the interface identifier 504 have special significance. The $7^{th}$ bit from the left is the Universal/Local bit or "u" bit. It is usually set to 1 to mean that the interface identifier 504 is configured from an EUI-64 identifier from the interface hardware and, thus is globally unique. The $8^{th}$ bit from the left is the Individual/Group or "g" bit, which is usually set to 1 for multicast addresses. The bit combination u=1, g=1 is currently unused because a multicast address cannot be globally unique. The present invention suggests that this bit combination be allocated for CGA addresses. The present invention may be used even if such allocation is not made. However, allocating the bit combination for CGA use enables mixed use of cryptographically generated and non-cryptographically generated addresses in any security protocol without weakening the security of either address type.

In accordance with the invention, the cryptographically generated addresses include the security parameter (Sec) 302, which determines the level of security. The security parameter is a 3-bit unsigned integer. It is encoded in the three rightmost bits of the 128-bit IPv6 address 314. The security parameter allows the address owner to increase the computational cost of address generation and, thus to also correspondingly increase the cost of brute-force attacks against the address. In effect and as explained in detail hereinafter, incrementing Sec 302 by one adds 12 bits to the length of the hash that the attacker must break. Since the security parameter value is encoded into the address bits, an attacker cannot change its value without also changing the address.

Figure 4:
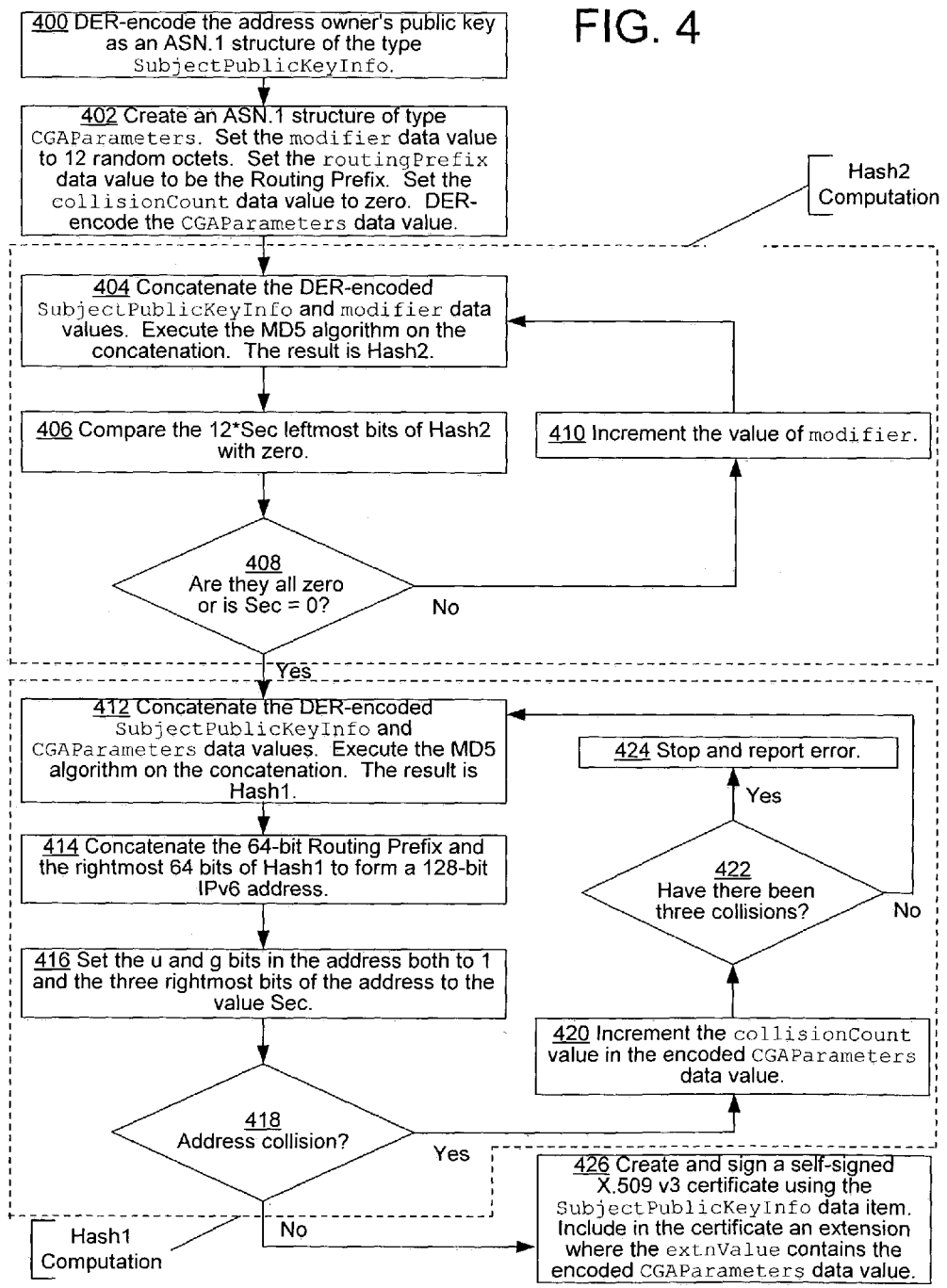
FIG. 4 is a flowchart of a procedure for creating a cryptographically generated address by the sending device.

With reference to the flowchart of FIG. 4, the procedure of generating a CGA begins in earnest with step 404, which is the computation of the second hash value 500. (Although called the "second" hash value herein, it is actually the first hash value calculated). Input into the second hash function includes the concatenation of the address owner's public key 300 and the modifier 306 data value (a random 12-octet string). The MD5 algorithm is executed on the concatenation. The MD5 algorithm is a one-way hash function, meaning that it takes a message and converts it into a fixed-length string of digits, also called a message digest.

The present invention makes use of the MD5 hash function for the implementation of both the first and second hash functions because MD5 implementations are commonly available (e.g., as part of every IP Security protocol (IPSec) implementation) and because the length of an MD5 hash value is conveniently 128 bits. The speed of the hash function is not important with respect to the address generation process. The purpose of the second hash function is to set the value of the modifier 306 data value, an input parameter for the first hash function, and it is the combination of the two hash values that increases the computational complexity of generating new addresses. Since the second hash function exponentially increases the cost of hashing, the small speed differences between MD5 and other hash functions are irrelevant in the present invention. While MD5 is used here as an example of a hash function, any other cryptographic function with the second-preimage-resistance property may be used instead.

The result of the second hash function is the Hash2 value 500 in FIG. 5. In step 406 of FIG. 4, the 12*Sec leftmost bits of Hash2 500 are compared with zero. If they are all zero, or if Sec=0, (step 408), the process continues with the step 412. Otherwise, the value of modifier 306 is incremented in step 410 as if the content octets of the modifier 306 were a 96-bit integer, and the process of computing the second hash value continues again with step 404.

For values of the security parameter 302 greater than zero, this process is not guaranteed to terminate after a certain number of iterations. The brute-force search in steps 404-410 takes, on the average, approximately $2^{12*Sec}$ iterations to complete (the median number of iterations is $0.69*2^{12*Sec}$).

The initial value of modifier 306 in step 402 and the method of modifying it in step 410 can be chosen arbitrarily. In order to avoid repeatedly trying the same value for modifier 306, the initial value may be chosen randomly. The quality of the random number generator is not important as long as the same values are not repeated frequently. One way to modify modifier 306 is to increment the content octets as if they were a 96-bit integer (with any byte order) 410.

Once the process of the second hash function has run to completion and the value of Hash2 has been selected, the address generation can be completed beginning with step 412. In steps 412 through 424, the first hash function is generated, which then completes the address.

In step 412, the public key 300 and CGAParameters structure 304 (a composite of several data fields, including the modifier 306, the routing prefix 308, and the collision count 310) are concatenated. The modifier value 306 is set in the preceding steps of the second hash computation. The collision count 310 is initially set to zero and is only incremented when an address collision occurs, a scenario that is explained below. The routing prefix 308 is obtained by the address creator from the network 100. This is possibly accomplished by listening on its network link for advertisements from the local router 106. For details on how this works on an IPv6 network, see the IETF RFC 2462 "IPv6 Stateless Address Autoconfiguration," which is herein incorporated in its entirety for everything it describes. The MD5 algorithm is executed on the concatenation (step 412). The result is the Hash1 value 502.

In keeping with the invention, the routing prefix 308 is not an essential input to the first hash function of the above step. While the omission of the routing prefix 308 from the input to the first hash function results in the two hash functions ostensibly being identical, this is permissible. The solution to the problem of having two identical hash results is to use a different hash function for the first and second hashes. For example, two completely different hash functions may be instantiated from the MD5 algorithm by merely appending a logical one or zero to the input of each hash function. As another example, the two hash values may be computed by dividing a longer hash value, such as a 160-bit SHA hash (i.e., Secure Hash Algorithm, another one-way hash function which produces a hash result 160 bits in length), into two parts.

Next, in step 414, the 64-bit routing prefix 308 and the rightmost 64 bits of Hash1 502 are concatenated to form a 128-bit IPv6 address 314. In step 416 and as illustrated in the schematic diagram of FIG. 5, the "u" and "g" bits in the address are both set to 1, and the three rightmost bits of the address are set to the value for Sec.

Continuing with process of generating the first hash value in step 418, the computing device 102 checks whether the generated address 314 is already in use by another node in the network. In other words, the computing device 102 checks whether there is an address conflict with respect to the CGA 314 it has generated. Different protocols may provide different ways of determining this. For example, in the Dynamic Host Configuration Protocol (DHCP), which is a protocol for assigning dynamic IP addresses to devices on a network, the server 104 keeps track of IP addresses and collisions between the addresses it leases. For IPv6, the mechanism is called "duplicate address detection." If the address is not already in use, the process of constructing the CGA of the sending device 102 is complete, and the procedure continues to step 426. If the constructed CGA is in use by another device, however, the collision count 310 value in the encoded CGA-Parameters structure 304 is incremented in step 420. If there have been three collisions, however, the process terminates and an error is reported at steps 422 and 424. Otherwise, the address generation process begins anew with step 412. If no address collision has been detected, the process terminates successfully in step 426 by creating and signing a self-signed certificate (e.g., a X.509 v3 certificate 316, the most widely used standard for defining digital certificates) using the public key 300. In protocols using the optimized parameter format (see Section IV below) rather than a certificate, step 426 is skipped, and the optimized parameter format is created.

As explained above, the Hash1 value 502 creates 59 bits of the interface identifier 504 in the address 314. The second hash function increases the cost of brute-force attacks, i.e., where the attacker varies the hash input in order to match its own public key with somebody else's address. In addition to matching the 59 address bits with Hash1, an attacker must match the 12*Sec zero bits with Hash2. This technique, called hash extension, effectively increases the hash length beyond the 64-bit boundary of earlier proposals. The resulting level of security is equal to a hash length of 59+12*Sec bits. If the routing prefix 308 of the address changes but the address owner's public key 300 does not, the old value of the modifier 306 can be used and it is unnecessary to repeat the brute-force search of steps 404 through 410 because the routing prefix 308 is not included in the computation of the Hash2 500.

Figure 6:
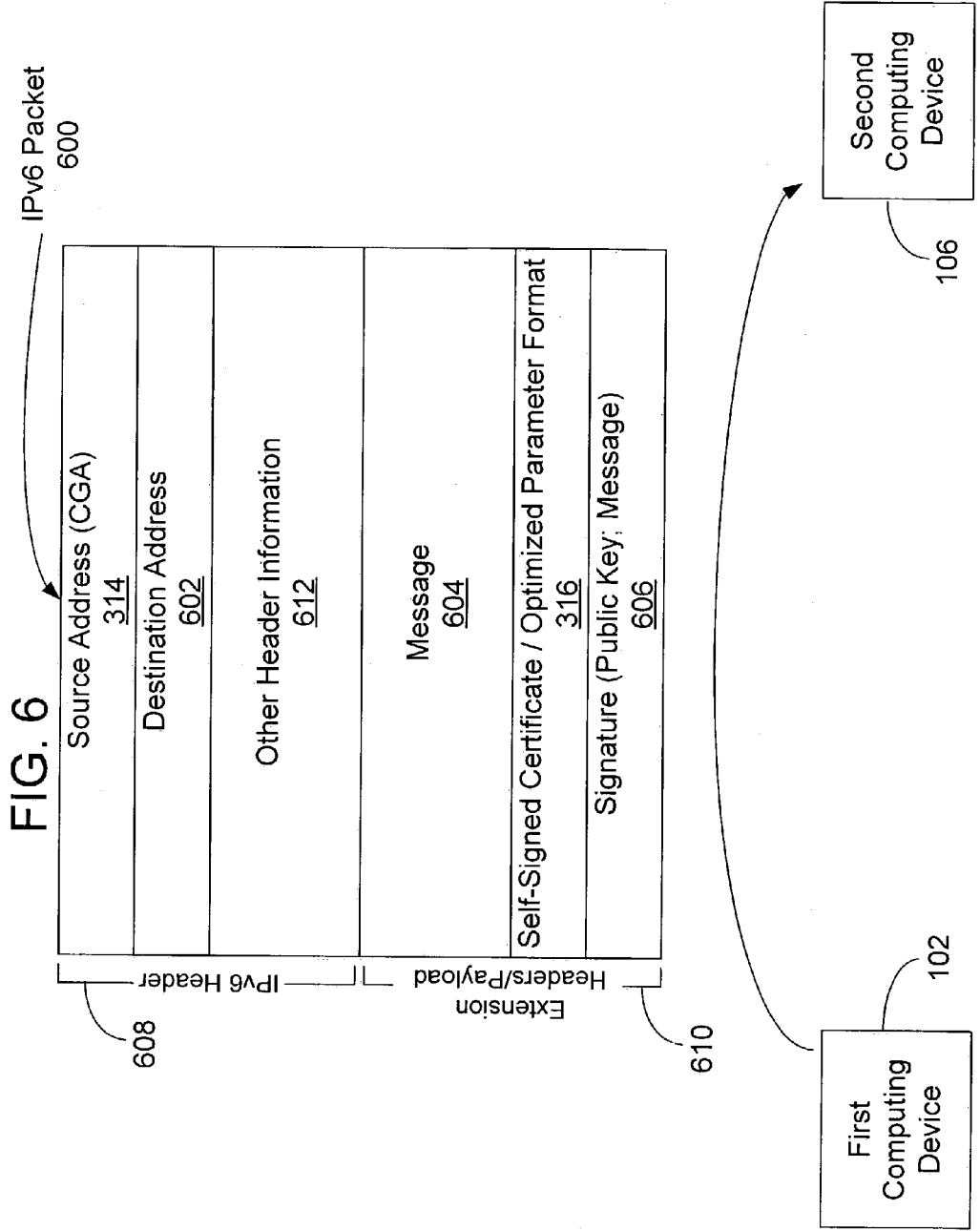
FIG. 6 is a schematic diagram showing the components of an authenticated message sent from the sending device to a receiving device.

By constructing the unique CGA 314 of the computing device 102 based on its public key 300, an association between the CGA 314 of the computing device 102 and its public key 300 is created. This association allows a recipient 106 in FIG. 6 of a message to authenticate the computing device 102 as the sender of the message by verifying the association. In order to authenticate a message as coming from a specific CGA address 314, as the address owner, the computing device 102 signs the message with its public key 300. As illustrated in FIG. 6, the computing device 102 then sends to the computing device 106 the packet 600 which includes the message 604, the signature 606, and the CGA certificate 316.

Referring now to FIGS. 6, 7, 8, and 9, the computing device 102 sends the message 600 to the recipient computing device 106 which is configured similarly to the computing device 102 as illustrated in FIG. 2. The message 600 contains, among other things such as the standard IP header 608, message content data 604, the CGA 314, and the self-signed certificate 316 created in the address generation process. The message content data 604 may be in plain-text (i.e., not hashed or encrypted). In addition to the plain text data, the message further includes a digital signature 606 generated from data included in the message. When the computing device 106 receives the authenticated message 600, it employs a verifier (FIG. 7) to attempt to authenticate the identity of the sender of the message.

Figure 7:
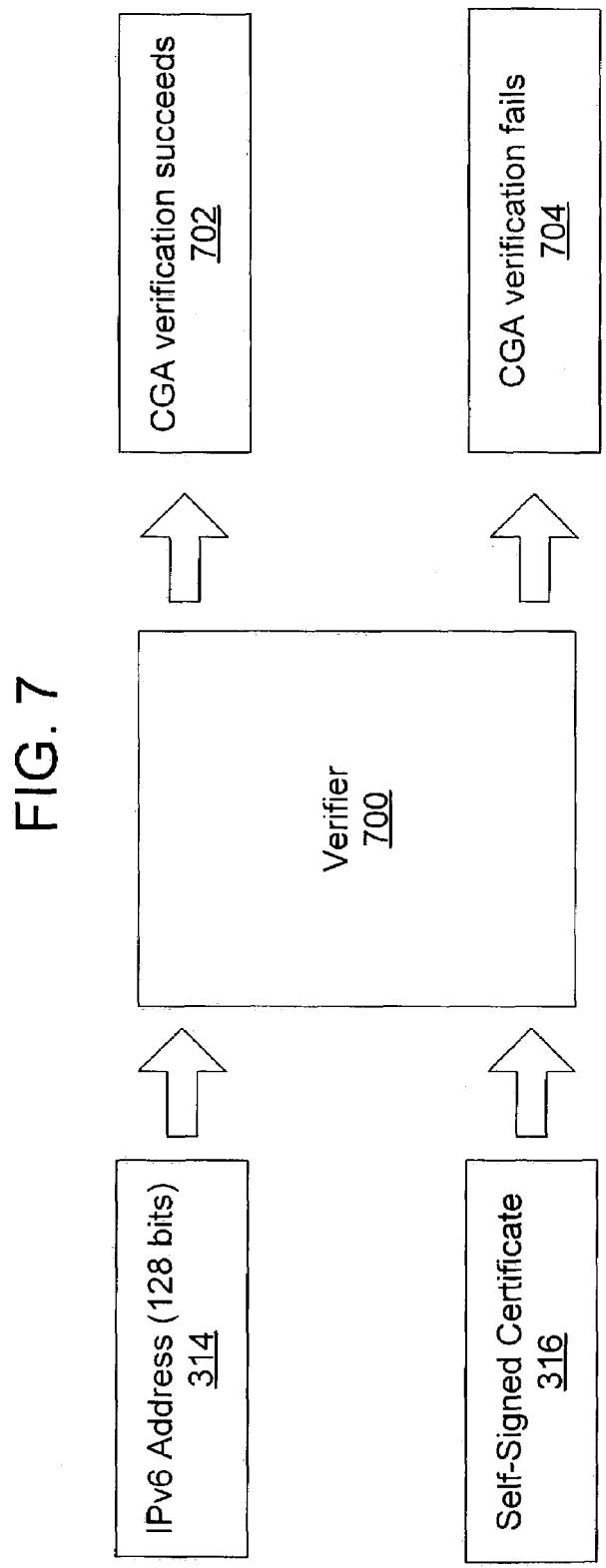
FIG. 7 is a schematic diagram showing inputs and outputs of the address ownership verification procedure.

The CGA verifier 700 in FIG. 7 takes two inputs from the received message 600: the IPv6 address 314 and the self-signed X.509 v3 certificate 316. In protocols where saving octets is essential, the certificate 316 may be replaced by the optimized parameter format. (See Section IV below.) The verifier 700 outputs either an indication 702 that the message 600 is trustworthy or an indication 704 that the message cannot be authenticated. If the verifier 700 provides the indication 702 that the message is trustworthy, the verifier knows that the certificate 316 contains the public key 300 of the address owner 102. The verifier 700 then uses the public key 300 to authenticate signed messages 600 from the address owner 102 or to exchange a session key with the address owner 102.

Figure 8:
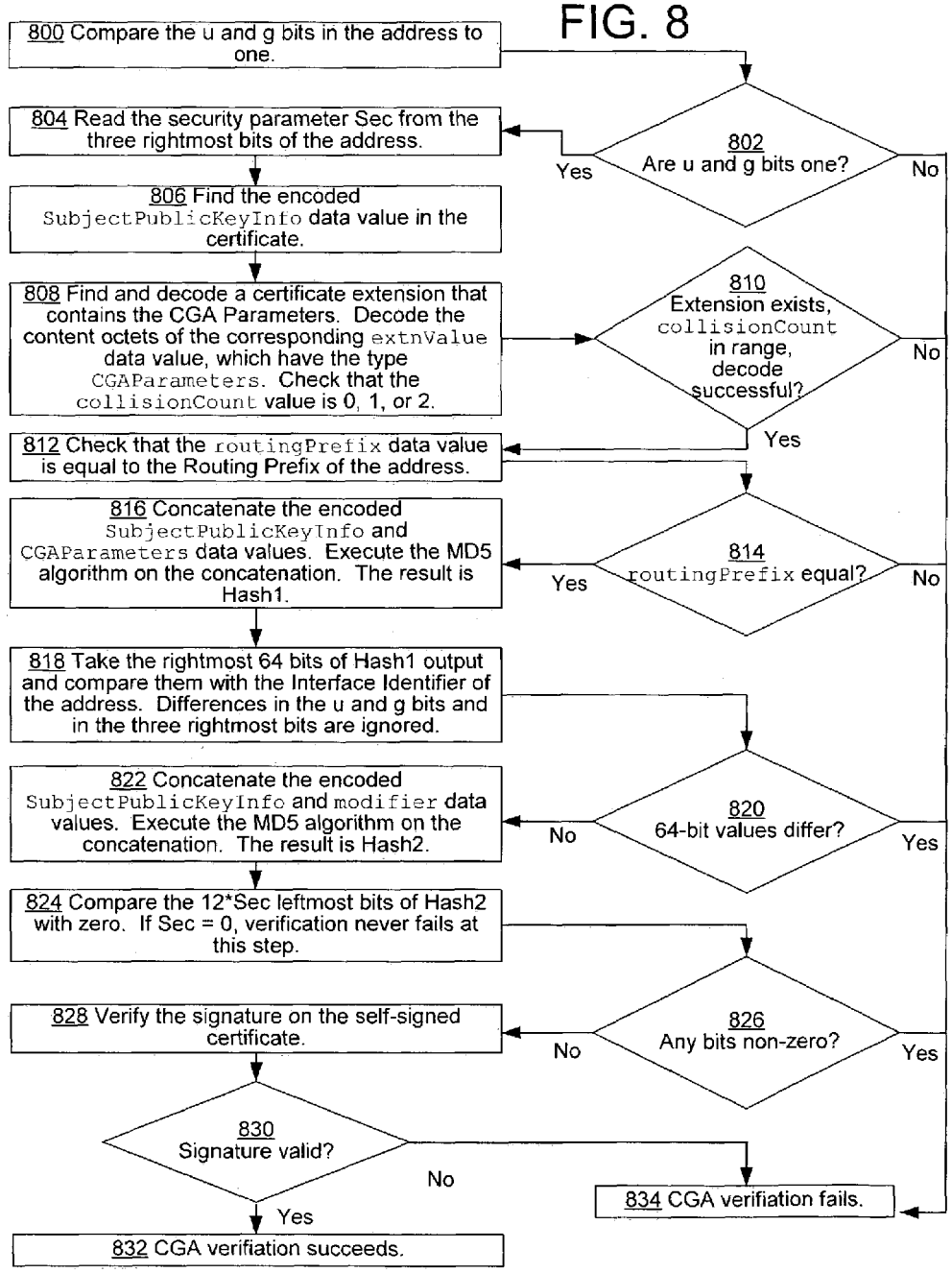
FIG. 8 is a flowchart of a procedure for verifying that a public key belongs to the owner of a cryptographically generated address.
Figure 9:
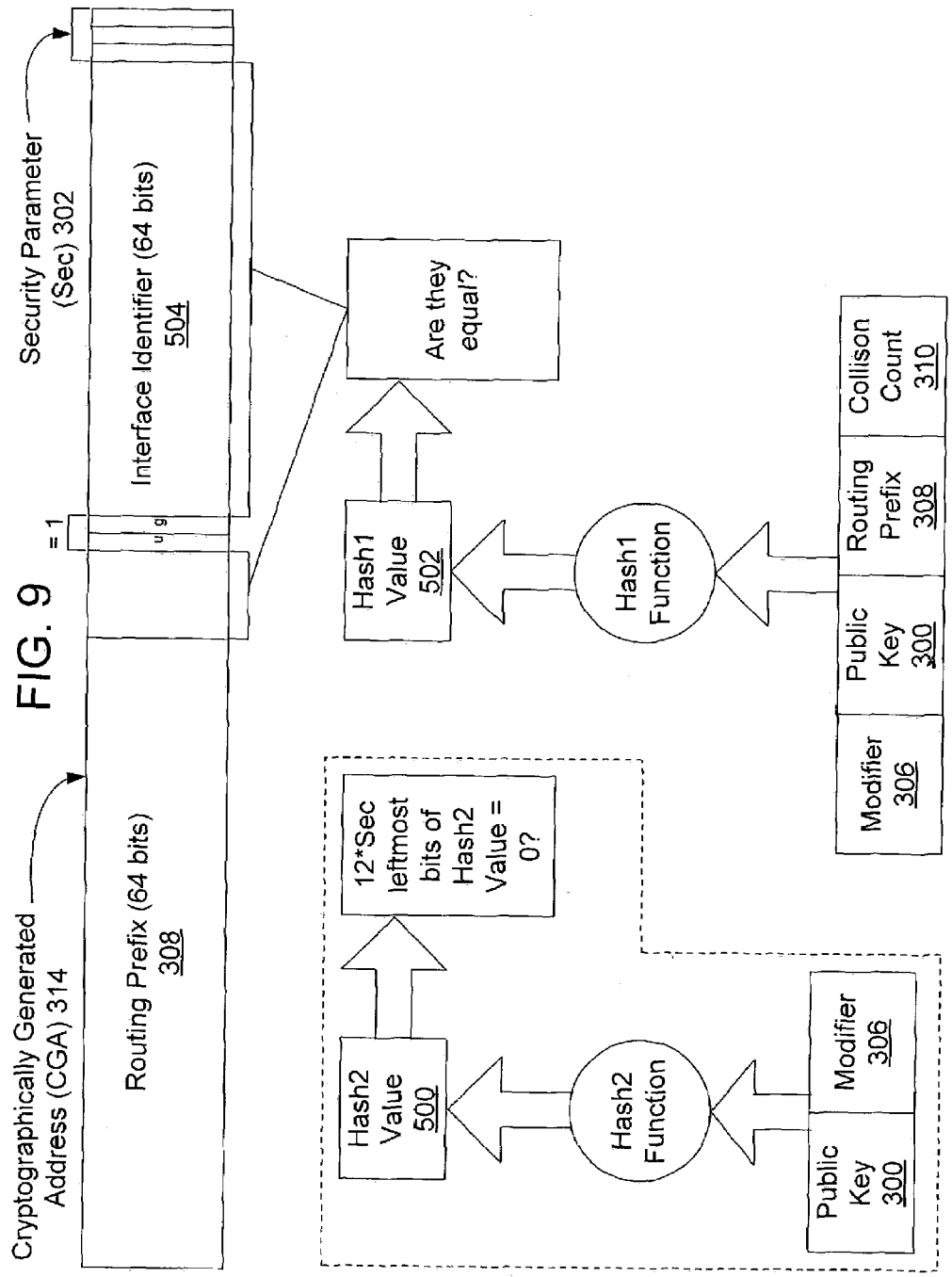
FIG. 9 is a schematic diagram showing how a receiving device verifies a binding between a public key and a cryptographically generated address.

FIGS. 8 and 9 illustrate the verification process executed by the verifier 700. Beginning with step 800, the "u" and "g" bits in the address are compared to one. If either bit is zero (step 802), the address 314 is a non-CGA address and verification cannot be done 834. Otherwise, continuing with step 804, the security parameter Sec 302 is read from the three rightmost bits of the address 314. Next, in step 806, the value of the public key 300 is located in the certificate 316. In step 808, the value of the collision count 310 is checked to be 0, 1, or 2. If not, verification fails in step 834. Next, in step 812, the value of the data for the routing prefix 308 stored in the CGAParameters structure 304 in the self-signed certificate 316 is checked to determine whether it is equal to the routing prefix (i.e., the leftmost 64 bits) of the address 314 in the message 600. If they differ, the verifier 700 issues at step 834 an indication 704 that the authentication of the message 600 has failed.

The public key 300 and data values of the CGAParameters structure 304 are concatenated in step 816. The MD5 algorithm is then executed on the concatenation. The result is the value for Hash1. In step 818, the rightmost 64 bits of Hash1 are compared with the interface identifier 504 of the address 314 (i.e., the rightmost 64 bits in FIG. 5). Differences in the "u" and "g" bits and in the three rightmost bits are ignored. If the 64-bit values differ (other than in the five ignored bits), the verifier 700 issues the indication 704 that the CGA verification process has failed at step 834.

Next, in step 822 the data values for the public key 300 and the modifier 306 are concatenated. The MD5 algorithm is then executed on the concatenation. The result is a value for Hash2. In step 824, the 12*Sec leftmost bits of Hash2 are compared with zero. If any one of these bits is non-zero, the verifier 700 issues the indication 704 at step 834, which says the authentication process has failed. If Sec equals zero, then authentication or verification never fails from step 824 since the number of leftmost bits of Hash2 to compare is zero (i.e., 12*0=0).

Finally, in step 828, the signature 606 on the self-signed certificate 316 of the packet 600 in FIG. 6 is verified using the public key 300. If the signature is determined to be invalid at step 834, the GCA authentication fails and the verifier issues the appropriate indication 704. If the address authentication succeeds at step 832, the verifier 700 knows that the address owner of the public key 300 in the certificate 316 is the computing device 102. The verifier 700 of the computing device has authenticated the address 314 as the address of the computing device 102 which sent the packet 600. The recipient computing device 106 is now free to accept the authenticated message content data 604 as authentic and to act on them accordingly.

Figure 10:
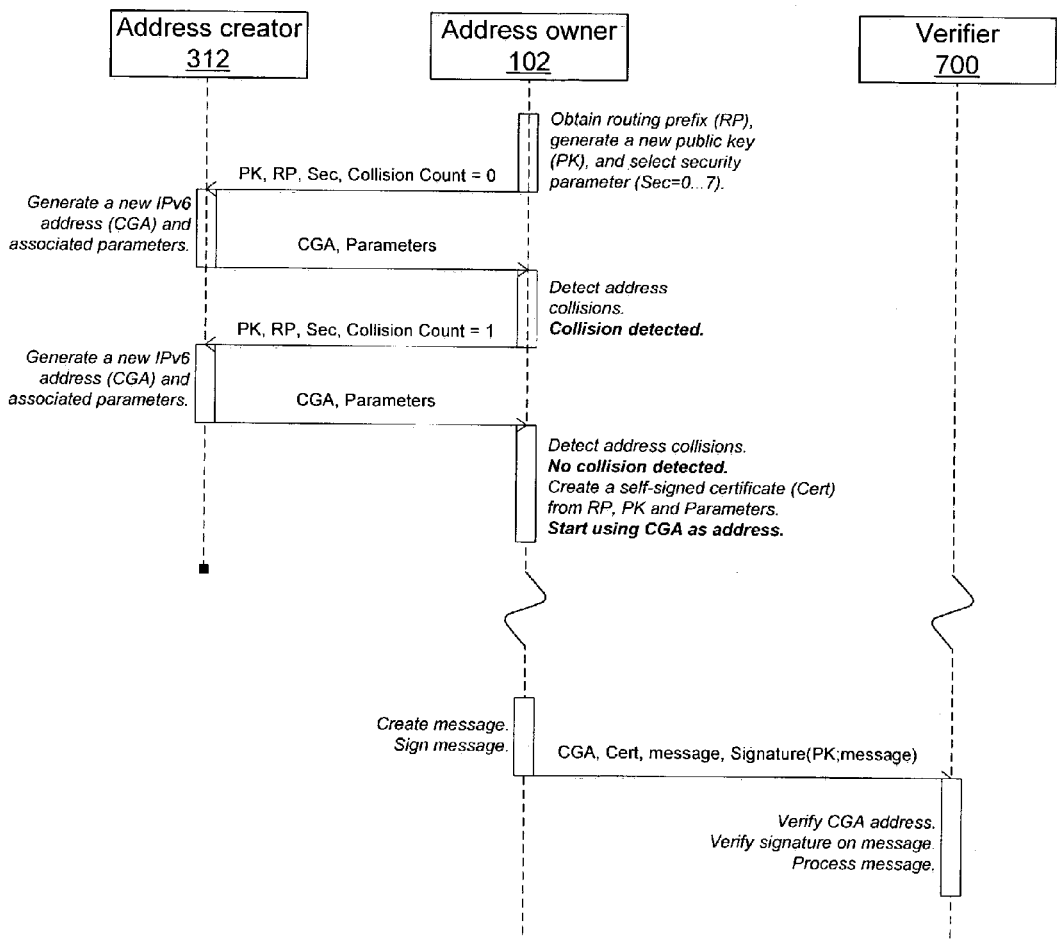
FIG. 10 is a sequence diagram showing the full life-cycle of the authentication process.

Referring to FIG. 10, the full life cycle of the authentication process is illustrated as a message sequence diagram. The process begins with the address owner (i.e., the computing device 102) providing the input to the address creator (i.e., generator 312). Upon successfully asserting ownership of a generated address, the address owner may then send information to a verifier 700 for authentication. Upon receiving the message the verifier may then attempt to verify it.

While using a value for Sec 302 value above zero is optional when the computing device generates the packet 600 for transmission to the recipient computing device 106, the address verifier 700 should support all Sec values. There are two reasons for this. First, the authentication procedure requires a constant amount of computation and is relatively fast, regardless of the value of Sec. Second, if verifiers did not support higher Sec values, there would be less incentive for an address owner to use them.

The values of modifier 306 and collision count 310 in the CGAParameters data structure are ignored in the process of authentication executed by the verifier 700, except for checking that collision count is in the allowed range in step 810 and including both values in the appropriate hash inputs in steps 816 and 822.

In keeping with the invention, the verifying party can be the same entity as the message creating party. For example, the computing device 102 creates messages 600 and stores them locally in one of the storage device 206 or 208 in FIG. 2. At a later time, the computing device retrieves the messages 600 and employs a local instance of the verifier 700 to authenticate the retrieved messages. In fact, the present invention is employable in any situation in which a message is retrieved and its integrity needs to be checked in order to provide some enhanced level of confidence that it is safe to process.

In protocols where the optimized parameter format (see Section IV below) is used instead of a certificate, the signature 606 verification in step 828 is skipped. For simplicity, it is suggested that all protocols that use the certificate 316 require the verification of its signature 606 and validity period. On the other hand, protocols that do not want to verify these parts should use the optimized parameter format for transferring the public key 300.

IV. Further Embodiments of Message Authentication

The algorithms for CGA address generation and authentication have been implemented as a C# class library. The core of the implementation consists of two classes: one that encapsulates the CGA certificate format and hash inputs and another that implements the algorithms essentially as described above. The only difference between the implementation and the described algorithms is that the implementation creates and signs the certificate before making the address available for duplicate detection. This helps to keep the implementation modular, at the expense of a very small performance penalty. The library currently uses the unmanaged Win32 Crypto-API for certificate creation, signing, and verification. The essential API functions are CryptEncodeObjectEx, CryptDecodeObjectEx, CryptSignCertificate, and CryptVerifyCertificateSignatureEx.

While the certificate format defined in the previous section is convenient for integrating CGA into key exchange and authentication protocols, it may waste valuable octets in some applications. Sometimes, it is necessary to fit an authenticated payload, a signature, and a certificate into a single unfragmented IP packet. This is the case, for example, in secure neighbor discovery. (See Section V below.) In such protocols, the certificate may consume an unacceptably large potion of the path maximum transfer unit, which is typically 1500 octets (for Ethernet). For this purpose, an optimized format for transferring and storing the public key and other parameters associated with the address is defined.

The optimized parameter format is simply the concatenation of the public key and CGAParameters structure data values, which normally would be parts of the certificate. These are the only parts of the certificate necessary for proving address ownership. The two hash values are computed exactly as in Section III.

One of the differences in terms of security is that since there is no self-signed signature in the optimized parameter format, there is no proof that the owner of the public key wanted to use the key for this purpose. Applications that use the optimized format should consider including the routing prefix in the signed data. Since the CGA address normally is the packet source address, this can be done without wasting any additional octets. The lack of a limited validity period in the optimized format can be similarly rectified by including the validity constraints in the signed message.

A protocol that supports CGA-based authentication of an IP address may also support other types of authentication. There may also be an unauthenticated mode. It is important not to allow weaker authentication methods for nodes that have a CGA address. (CGA addresses have both u and g bits are set to 1.) Otherwise, an attacker could "bid down", i.e., select the weaker authentication method. Nodes with a non-CGA address may continue using the unauthenticated and weaker protocol versions.

CGA-based authentication is often attractive for performance and cost, rather than for security, reasons. For example, it could be used as a backup when there is no appropriate PKI certificate available, or when contacting an on-line authority has too high a performance penalty. There are no problems in combining CGA-based authentication with other equally strong authentication methods.

V. Applications of Unilateral Authentication

The present invention is applicable to several other applications. The authentication mechanism associates an authenticated message with its creator. Potential applications for CGA-based authentication include proof of address ownership in secure neighbor discovery and duplicate address detection, Mobile IPv6 binding update authentication, and key exchange for opportunistic IPSec encryption and authentication.

The IPv6 address autoconfiguration, duplicate address detection (DAD), and neighbor discovery (ND) are threatened by denial-of-service attacks. The problem is that it is not clear who owns an IP address and who is authorized to control the mapping between an IP address and link-layer addresses. In stateless autoconfiguration, an IPv6 node picks an arbitrary IPv6 address in the network where it is located and sends a broadcast message to check that nobody else is already using the same address. An attacker can prevent other nodes from obtaining an IP address by responding to all duplicate address detection messages and claiming to be using any address that the target nodes pick. The present invention would solve this dilemma in that duplicate address detection messages could be authenticated using the message address and associated public key.

Neighbor discovery is the IPv6 equivalent of ARP, i.e., a protocol for mapping IP addresses into link-layer addresses. A well known problem is that an attacker can redirect packets away from their right next-hop destination by spoofing neighbor discovery messages.

CGA addresses can prevent the attacks described above. CGA addresses are particularly suitable for securing these protocols because the goal is to authenticate an IP address and not some higher-level identifier. A node can create a new CGA address and then prove its ownership of the address by signing the DAD messages. Similarly, signatures on ND messages prevent the spoofing attacks. In both protocols, it is necessary to sign individual IP packets. Thus, the optimized parameter format is appropriate for these applications.

In the Mobile IPv6 draft specification, the mobile node informs its correspondents about its current location by sending binding updates which must be authenticated to prevent denial-of-service attacks. The current draft uses a relatively weak, non-cryptographic authentication method based on the assumption that some network routes are likely to be secure. An alternative would be to use CGA-based public-key authentication. CGA addresses would be particularly suitable for this purpose because Mobile IP uses IP addresses as the only node identifier. CGA-based authentication could also reduce the number of protocol messages. Thus, there may be a case for specifying CGA-based authentication as an optional optimization.

If both end nodes of a connection have a CGA address, they can use the CGA certificates in a key exchange and create an IPSec security association for encryption and data authentication. It is suggested that this kind of authentication is done "opportunistically", i.e., whenever both end nodes support CGA. The benefits of opportunistic protection include prevention of IP source spoofing attacks, privacy against passive eavesdropping, and protection against filtering of IP packets by network intermediaries.

It is important to note that the sending and receiving nodes are authenticating each other's IPv6 addresses, not the host names or users. Therefore, the CGA-based authentication prevents only IP source-address spoofing but not DNS spoofing where the attacker interferes with the mapping of domain names to IP addresses.

In the future, Secure DNS may give a reasonable assurance of the authenticity of IP addresses. Together, Secure DNS and CGA provide strong authentication of hosts by their domain names. There have also been proposals for storing PKI certificates or public keys in the DNS. An advantage of combining CGAs with Secure DNS is that the name service need not store the public keys. It only needs to provide a reliable binding between host names and addresses, which is its original function.

In view of the many possible embodiments to which the principles of this invention may be applied, it should be recognized that the embodiments described herein with respect to the drawing figures are meant to be illustrative only and should not be taken as limiting the scope of invention. For example, for performance reasons the cryptographic operations may be implemented in hardware, such as on a network card, rather than in software. Therefore, the invention as described herein contemplates all such embodiments as may come within the scope of the following claims and equivalents thereof.

For further information see Tuomas Aura, "Cryptographically Generated Address (CGA)", January 2003, submitted for publication, which is herein incorporated in its entirety for everything it describes.

What is claimed is:

1. A method for generating a cryptographic address, the method comprising:

setting an initial value for a modifier;

determining the value of the modifier for use by a first hash function by executing a second hash function on a public key and the modifier, repeating the execution of the second hash function while changing the value of the modifier until the second hash function yields a target result, wherein the target result of the second hash function is determined in part by a security parameter value;

concatenating a public key and the modifier;

executing the first hash function on the concatenated public key and the modifier to yield a first hash function value; and concatenating a portion of an address that is not node-selectable and at least a portion of the first hash function value to create a network address.

2. The method of claim 1, wherein the portion of the network address that is not node-selectable is also concatenated with the public key and modifier as input to the first hash function.

3. The method of claim 1, wherein the public key and the modifier values are formatted as parts of a self-signed certificate.

4. The method of claim 1, wherein a portion of the network address comprises the security parameter value.

5. The method of claim 1, wherein the security parameter value is selected by a first computing device.

6. A computer storage medium containing instructions for performing a method for generating a cryptographic address, the method comprising:

setting an initial value for a modifier;

determining the value of the modifier for use by a first hash function by executing a second hash function on a public key and the modifier, repeating the execution of the second hash function while changing the value of the modifier until the second hash function yields a target result, wherein the target result of the second hash function is determined in part by a security parameter value;

concatenating a public key and the modifier;

executing the first hash function on the concatenated public key and the modifier to yield a first hash function value; and concatenating a portion of an address that is not node-selectable and at least a portion of the first hash function value to create a network address.

7. A method for a second computing device to authenticate content data made available by a first computing device, the method comprising:

accessing authentication information made available by the first computing device, the authentication information including content data, a network address of the first computing device, a public key of the first computing device, and a modifier;

computing a first hash value using a first hash function, the input to the first hash function including a concatenation of the public key and the modifier;

computing a second hash value using a second hash function, the input to the second hash function including a concatenation of the public key and the modifier; and accepting the content data if the second hash value matches a target result, and the first hash value matches a second corresponding portion of the network address, wherein the target result of the second hash function is determined in part by a security parameter value.

8. The method of claim 7, wherein the portion of the network address that is not node-selectable is also concatenated with the public key and modifier as input to the first hash function.

9. The method of claim 7, wherein the public key and the modifier values are formatted as parts of a self-signed certificate.

10. The method of claim 7, wherein the security parameter value is selected by the first computing device.

11. The method of claim 7, wherein a portion of the network address comprises the security parameter value.

12. A computer storage medium containing instructions for performing a method for a second computing device to authenticate content data made available by a first computing device, the method comprising:
- accessing authentication information made available by the first computing device, the authentication information including content data, a network address of the first computing device, a public key of the first computing device and a modifier;
- computing a first hash value using a first hash function, the input to the first hash function including a concatenation of the public key and the modifier;
- computing a second hash value using a second hash function, the input to the second hash function including a concatenation of the public key and the modifier; and
- accepting the content data if the second hash value matches a target result, and the first hash value matches a second corresponding portion of the network address, wherein the target result of the second hash function is determined in part by a security parameter value.

13. A method for a computing device to derive a node-selectable portion of a network address from a public key of the computing device, the method comprising:
- computing a first hash value using a first hash function, the input to the first hash function including a concatenation of the public key and a modifier, the modifier value set by a second hash function;
- computing a second hash value using the second hash function, the input to the second hash function including a concatenation of the public key and the modifier;
- comparing a portion of the second hash value with a target result, wherein the target result of the second hash value is determined in part by a security parameter value;
- if the portion does not match the target result, modifying the value of the modifier, concatenating the modifier with the public key, and repeating the computing of a second hash function and the comparing;
- setting the node-selectable portion of the network address to a portion of the first hash value; and
- checking to see if the network address as set is already in use and if the network address as set is already in use, repeating the computing of the first hash value, the setting of the node-selectable portion of the network address, and the checking to see if the network address is already in use.

14. The method of claim 13, wherein a portion of the network address that is not node-selectable is also concatenated with the public key and modifier as input to the first hash function.

15. The method of claim 14, wherein a portion of the network address other than the node-selectable portion comprises an element selected from the group consisting of: a Universal bit, a Group bit, and a routing prefix.

16. The method of claim 13, wherein a portion of the network address comprises the security parameter value.

17. The method of claim 13, wherein the security parameter value is selected by the computing device.

18. A computer storage medium containing instructions for performing a method for a computing device to derive a node-selectable portion of a network address from la public key of the computing device, the method comprising:
- computing a first hash value using a first hash function, the input to the first hash function including a concatenation of the public key and a modifier, the modifier value set by a second hash function;
- computing a second hash value using the second hash function, the input to the second hash function including a concatenation of the public key and the modifier;
- comparing a portion of the second hash value with a target result, wherein the target result of the second hash value is determined in part by a security parameter value;
- if the portion does not match the target result, modifying the value of the modifier, concatenating the modifier with the public key, and repeating the computing of a second hash function and the comparing;
- setting the node-selectable portion of the network address to a portion of the first hash value; and
- checking to see if the network address as set is already in use and if the network address as set is already in use, repeating the computing of the first hash value, the setting of the node-selectable portion of the network address, and the checking to see if the network address is already in use.

* * * * *